United States Patent
Yamamoto et al.

(10) Patent No.: US 7,325,240 B2
(45) Date of Patent: Jan. 29, 2008

(54) METHOD FOR GENERATING CALLING CONVENTION TRANSFORMATION PROCESS

(75) Inventors: Nobuyuki Yamamoto, Yokohama (JP); Jun Yoshida, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 956 days.

(21) Appl. No.: 10/410,149

(22) Filed: Apr. 10, 2003

(65) Prior Publication Data

US 2004/0083483 A1 Apr. 29, 2004

(30) Foreign Application Priority Data

Oct. 29, 2002 (JP) .............................. 2002-313615

(51) Int. Cl.
*G06F 3/00* (2006.01)

(52) U.S. Cl. ...................... 719/330; 719/328; 719/331; 719/332

(58) Field of Classification Search ................ 718/108; 719/330–332, 328

See application file for complete search history.

(56) References Cited

U.S. PATENT DOCUMENTS 5,452,456 A * 9/1995 Mourey et al. ............. 713/100
6,604,198 B1 * 8/2003 Beckman et al. ........... 713/167

OTHER PUBLICATIONS

Java 2 Platform, Enterprise Edition Specification, vol. 3 (2001), First and Second Chapters, pp. 1 to 16, Sun Microsystems, Inc.
Enterprise JavaBeans Specification, vol. 2.0 (2001), Chapter 4.2.1, pp. 43 & 44, Chapter 4.4, p. 49 and Chapter 5, pp. 51-54, Sun Microsystems, Inc.

* cited by examiner

*Primary Examiner*—Meng-Al T. An
*Assistant Examiner*—Kenneth Tang
(74) *Attorney, Agent, or Firm*—Mattingly, Stanger, Malur & Brundidge, P.C.

(57) ABSTRACT

It is checked, by referring to a deployment descriptor and type information of a component, whether the calling convention to be used by a caller component is the same as the calling convention to be used by a callee component, and if different, a class and an object of a proxy for performing a calling convention transformation process is generated.

5 Claims, 6 Drawing Sheets

METHOD FOR GENERATING CALLING CONVENTION TRANSFORMATION PROCESS

BACKGROUND OF THE INVENTION

The present invention relates to a method and apparatus for transforming calling conventions if calling conventions are different between applications to be deployed in execution environments by using deployment descriptors.

In order to promptly deal with a change in business environments, it is highly required to shorten the development period, reduce the development cost, facilitate the expansion of scales and functions, respectively of enterprise systems. In order to satisfy these requirements, component models are prevailing in which applications are changed into components with reusability which are combined to configure systems. In the component model, in order to reuse components without any modification in a plurality of different execution environments, information dependent upon execution environments is not contained in components, but an administrator sets the information when the administrator disposes the components in the execution environments by using tools. The works of such setting and disposal to be made by an administrator are called deployment.

Java 2 Platform is known as a component model (for example, refer to "Java 2 Platform, Enterprise Edition Specification, vl. 3 (2001), First and Second Chapters (pp. 1 to 16), issued by Sun Microsystems, Inc., USA (Document 1)). Java and J2EE are registered trademarks of Sun Microsystems, Inc., USA. In this Document 1, a component is called an application component, an execution environment is called a container, and a term, deployment descriptor, is used.

In combining components, an administrator sets component reference from a caller component to a callee component and an execution program of the caller component executes a component call.

The component reference is set when an administrator gives a correspondence between a logical name of a caller component and a physical name of a callee component. The logical name is a name to refer another component by the caller component without dependence upon the execution environment and is contained in the deployment descriptor of a caller component. The physical name is a concrete name dependent upon the execution environment publicized by a callee component to another component and is assigned when an administrator deploys the callee component in the execution environment.

Enterprise JavaBeans is known as a combination of components (for example, refer to "Enterprise JavaBeans Specification, v 2.0 (2001), Chapter 4.2.1 (pp. 43 and 44), Chapter 4.4 (p. 49) and Chapter 5 (pp. 51 to 54), issued by Sun Microsystems, Inc., USA (Document 2)). Enterprise JaveBeans is a registered trademark of Sun Microsystems, Inc., USA. In this Document 2, local and remote calling conventions are defined for component call, and the remote calling convention is defined as a distributed object call.

SUMMARY OF THE INVENTION

According to conventional techniques, different calling interfaces are used for the local and remote calling conventions. A component call process contained in the execution program of a caller component is dependent upon a calling interface as well as a calling convention.

If caller and callee components combined by using the local calling convention in the same execution environment are deployed and combined in a different execution environment, a calling convention to be used is changed and a remote calling convention is used. Since the local calling convention is reflected upon the execution program contained in the caller component, the execution program is required to be modified when the calling convention is changed. As described above, when a component is deployed in a different execution environment, the component cannot be reused unless it is modified.

An object of the invention is to provide a method and apparatus for generating a calling convention transformation process capable of solving the above-described problems associated with conventional techniques.

Another object of the invention is to provide such a method and apparatus for generating a calling convention transformation process capable of deploying and combining call components without any modification.

The above objects of the invention can be achieved, for example, by the following procedure.

A calling convention and a calling interface name corresponding to a logical name are acquired from a deployment descriptor of a caller component, which are used as a caller calling convention and a caller interface name. An inherited interface is acquired from type information of a reference object of a callee component acquired by designating the logical name, which is used as a callee interface. A convention interface inherited by the callee interface is acquired to check whether the convention interface corresponds to either a local calling convention or a remote calling convention, and the corresponding calling convention is used as a callee calling convention. If the caller calling convention is the local calling convention and if the callee calling convention is the remote calling convention, a calling convention transformation process is executed.

This calling convention transformation process is executed by a proxy object. The proxy object is an instance of a proxy class implemented by inheriting the caller interface, and is viewed from the caller component as if it is an object which conforms with the local calling convention. The proxy object stores data of the reference object of the callee component. Upon reception of a method call from the caller component in conformity with the local calling convention, the proxy object transfers the method call to the stored reference object to call the callee component in accordance with the remote calling convention. In this manner, the calling convention transformation process is executed.

A class used for generating the proxy object is called a proxy class. The proxy class is generated by using information on the caller interface and callee interface.

According to the invention, the caller component and callee component combined by using the local calling convention in the same execution environment can be reused, deployed and combined in a different execution environment without any modification.

Other objects, features and advantages of the invention will become apparent from the following description of the embodiments of the invention taken in conjunction with the accompanying drawings.

DETAILED DESCRIPTION OF THE EMBODIMENTS

Figure 1:
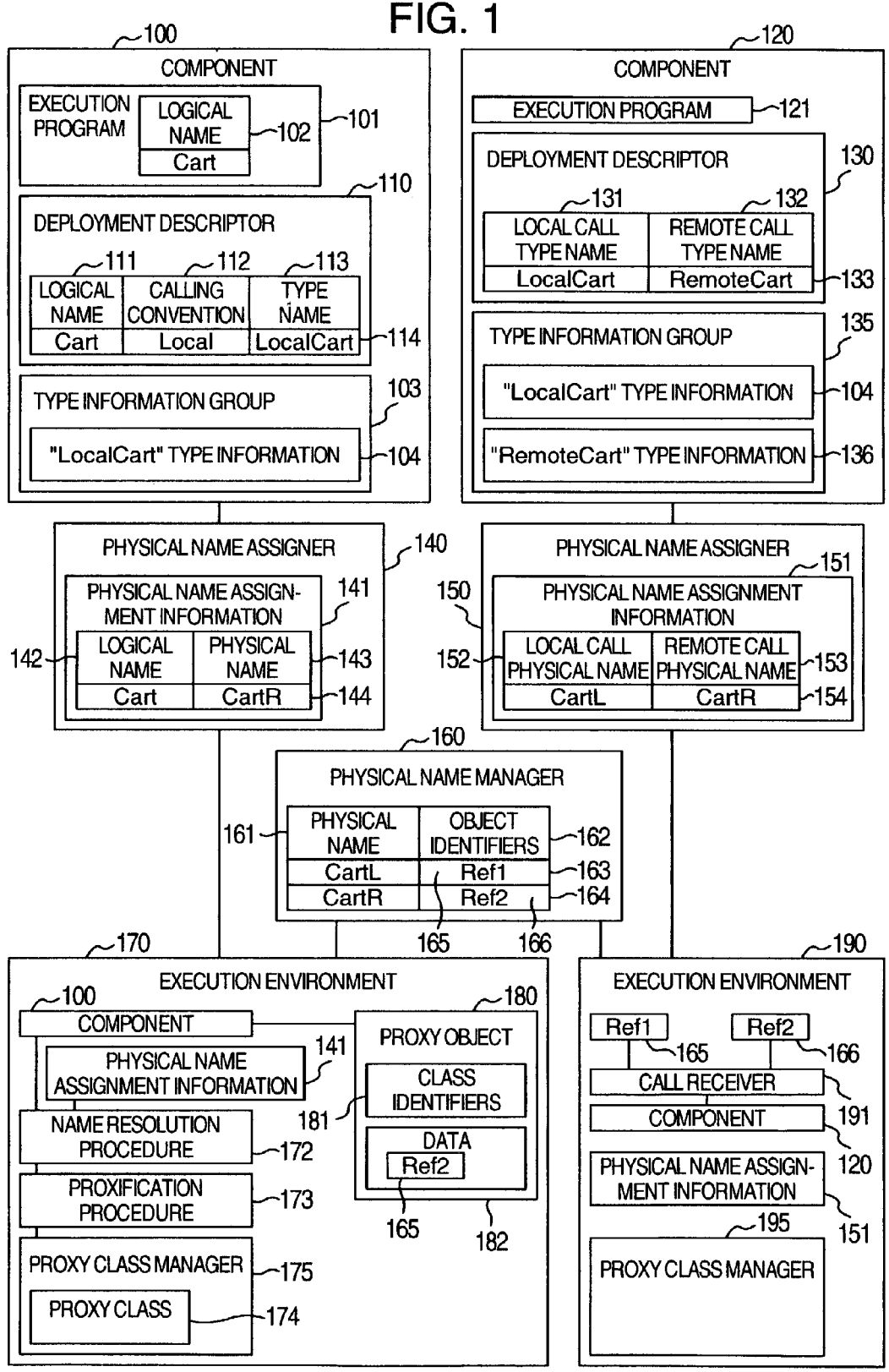
FIG. 1 is a diagram showing the outline structure of an embodiment.
Figure 2:
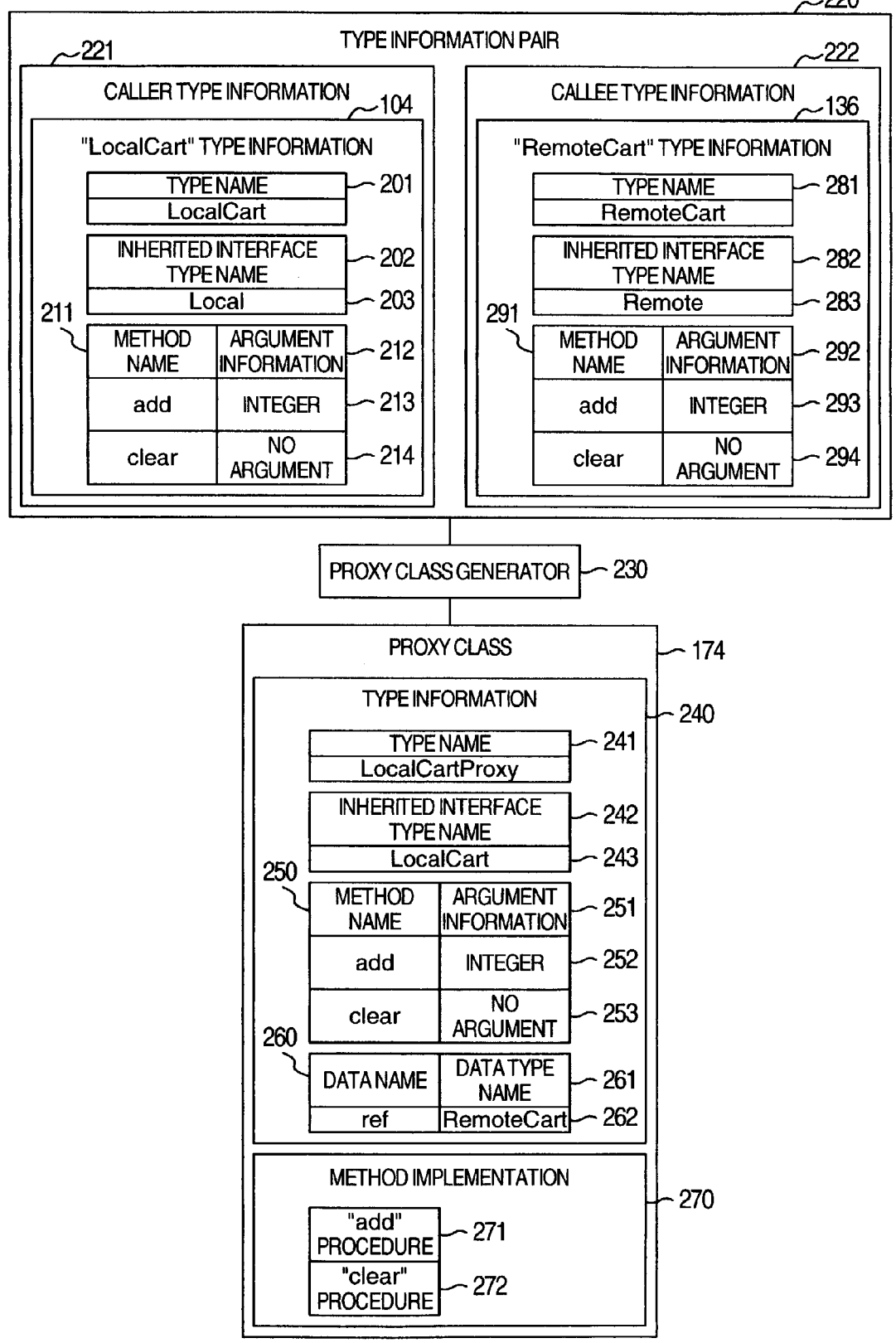
FIG. 2 is a diagram showing type information, the details of a proxy class for performing a process of transforming a calling convention, and a proxy class generator.

Embodiments of the invention will be described with reference to the accompanying drawings. FIGS. 1 and 2 show the outline structure of an embodiment.

A caller component 100 is deployed in a caller execution environment 170 by a physical name assigner 140 or deployment tools. A callee component 120 is deployed in a callee execution environment 190 by a physical name assigner 150 or deployment tools. At this time, the callee execution environment 190 registers an object identifier representative of the component 120 in a physical name manager 160 or name server to allow the caller execution environment 170 to refer to the object identifier. The component 100 deployed in the execution environment 170 acquires the object identifier representative of the component 120 registered in the physical name manager 160 and performs an object call to call the component 120 deployed in the execution environment 190.

Each element will be detailed in the following.

The caller component 100 includes an execution program 101, a deployment descriptor 110 and a type information group 103. The execution program 101 refers to a logical name "Cart" 102. The deployment descriptor 110 includes items, a logical name item 111 for describing a logical name, a calling convention item 112 for describing a calling convention to be used when a component is called by using the logical name, and a type name item 113 for describing a type name of the calling interface to be used when the component is called by using the logical name. The deployment descriptor 110 has a record 114 for each logical name to be referred to by the component. The logical name "Cart", a calling convention "Local" and a type name "LocalCart" are stored in the record 114. The type information group 103 includes LocalCart type information 104 which is type information of the interface having the type name "Local-Cart" in the record 114. Since the interface "LocalCart" conforms with the local calling convention, the interface inherits a convention interface "Local" which is an interface of the local calling convention.

The callee component 120 includes an execution program 121, a deployment descriptor 130 and a type information group 135. The deployment descriptor 130 includes items, a local call type name item 131 for describing a calling interface to be used by the local calling convention at a call receiver 191 and a remote calling convention item 132 for describing a calling interface to be used by the remote calling convention at the call receiver 191. The deployment descriptor 130 has a record 133 for the call receiver 191. A local call type name "LocalCart" and a remote call type name "RemoteCart" are stored in the record 133. The type information group 135 includes LocalCart type information 104 which is type information of the interface having the local call type name "LocalCart" in the record 133, and RemoteCart type information 136 which is type information of the interface having the remote call type name "RemoteCart". Since the interface "RemoteCart" conforms with the remote calling convention, the interface inherits a convention interface "Remote" which is an interface of the remote calling convention.

The physical name assigner 140 reads the component 100 and outputs it together with the physical name assignment information 141 to the execution environment 170. The physical name assignment information 141 includes items, a logical name item 142 for describing a logical name to be referred by the component and a physical name item 143 for describing a physical name corresponding to the logical name. The physical name assignment information 141 has a record 144 for each logical name to be referred by the component. The logical name "Cart" and a physical name "CartR" are stored in the record 144.

The physical name assigner 150 reads the component 120 and outputs it together with the physical name assignment information 151 to the execution environment 190. The physical name assignment information 151 includes items, a local call physical name item 152 for describing a physical name to be assigned to the local calling convention at the call receiver 191 and a remote call physical name item 153 for describing a physical name to be assigned to the remote calling convention at the call receiver 191. The physical name assignment information 151 has a record 154 for the call receiver 191. A local call physical name "CartL" and the remote call physical name "CartR" are stored in the record 154.

The physical name manager 160 has items, a physical name item 161 for describing a physical name and an object identifier item 162 for describing the call receiver 191 for the component corresponding to the physical name. The physical name manager 160 has a record for each physical name. The physical name "CartL" and an object identifier "Ref1" 165 are stored in a record 163, and the physical name "CartR" and an object identifier "Ref2" 166 are stored in a record 164.

The execution environment 170 has the component 100, physical name assignment information 141, a name resolution procedure 172, a proxification procedure 173, a proxy class manager 175 and a proxy object 180.

The execution program 101 passes the logical name to the name resolution procedure 172 to acquire the reference object of the callee component, and calls a method of the reference object to call the callee component. In the example shown in FIG. 1, the proxy object 180 is acquired as the reference object for the logical name "Cart" 102.

The name resolution procedure 172 receives the logical name, passes the logical name and an object identifier corresponding to the logical name and obtained by referring to the physical name assignment information 141 and physical name manager 160, to the proxification procedure 173, and outputs the result at the proxification procedure 173 as a reference object. In the example shown in FIG. 1, the logical name "Cart" 102 is received and the physical name assignment information 141 is referred to obtain the physical name "CartR" corresponding to the logical name "Cart" 102. The physical name manager 160 is referred to acquire the object identifier "Ref2" 166 corresponding to the physical name "CartR". Next, the logical name "Cart" 102 and object identifier "Ref2" 166 are passed to the proxification procedure 173 and the result of this procedure is output as the reference object.

The proxification procedure 173 receives the logical name and the object identifier. The proxification procedure 173 checks whether the calling convention of the caller obtained by referring to the deployment descriptor 110 by using the logical name is the same as the calling convention of the callee obtained from the type information of the object identifier. If the same, the proxification procedure outputs the object identifier as the reference object. If not the same, the proxification procedure passes the type name in the type name item 113 obtained by referring to the deployment descriptor 110 by using the logical name and the object identifier, to the proxy class manager 175 to acquire the proxy class, generate a proxy object, i.e., an instance of the proxy class, and output the proxy object storing the object identifier as the reference object.

In the example shown in FIG. 1, the logical name "Cart" 102 and the object identifier "Ref2" 166 are input. The deployment descriptor 110 is referred to by using the logical name "Cart" 102 to obtain the calling convention "Local" which is the local calling convention of the caller. The RemoteCart type information 136 is acquired by using the object identifier "Ref2". Since the type name 283 of the inherited interface is "Remote", the calling convention of the callee is the remote calling convention. Since the calling convention of the caller is the local calling convention and the calling convention of the callee is the remote calling convention, the type name "LocalCart" in the type name item 113 obtained by referring to the deployment descriptor 110 by using the logical name "Cart" and the object identifier "Ref2" 166 are passed to the proxy manager 175 to acquire the proxy class 174, generate the proxy object 180, i.e, an instance of the proxy class 174, and output the proxy object storing the object identifier "Ref2" 166 as the reference object.

The proxy class manager 175 generates the proxy class 174 by referring to the type information or acquires the proxy class 174 from the execution environment 190. The proxy class 174 is a class of the proxy object 180. The proxy object 180 includes a class descriptor 181 for referring to the proxy class 174 and data 182. The data 182 contains the object identifier "Ref2" 166.

The execution environment 190 has the component 120, physical name assignment information 151, object identifier "Ref1" 165, object identifier "Ref2" 166 and a proxy class manager 195. When the component is to be deployed, the execution environment 190 refers to the physical name assignment information 151, generates object identifiers 165 and 166 for each calling convention at the call receiver 191, and registers pairs of the physical name and object identifier in the physical name manager 160. In this embodiment wherein the proxy class manager 175 acquires the proxy class 174 from the proxy class manager 195, the proxy class manager 195 generates the proxy class 174 by referring to the information in the execution environment 190 so that the proxy class manager 175 can acquire the proxy class 174.

The call receiver 191 is a wrapper for shielding the component 120 from the caller and is generated by the execution environment 190 when the component 120 is deployed. When a call from the caller is received at the call receiver 191, the call receiver 191 calls the component 120.

FIG. 2 is a diagram showing type information, the details of the proxy class for performing a process of transforming a calling convention, and a proxy class generator.

The proxy class generator 230 receives a type information pair 220 and generates a proxy class 174. The type information pair 220 includes type information of the calling interface of the caller and the type information of the calling interface of the callee.

The type information pair includes caller type information 221 and callee type information 222. The caller type information 221 is type information of a calling interface of the caller. The callee type information 222 is type information of the calling interface of the callee. In the example shown in FIG. 2, the caller type information 221 contains LocalCart type information 104, and the callee type information 222 contains RemoteCart type information 136.

The type information includes a type name, a inherited interface type name, and method information.

The LocalCart type information 104 contains a type name 201, an inherited interface type name 202 and method information. The type name 201 describes the type name of the LocalCart interface and stores a value "LocalCart". The inherited interface type name 202 describes the interface inherited by the LocalCart interface, and has a record 203 for each inherited interface. A convention interface "Local" corresponding to the local calling convention is stored in the record 203. The method information includes items, a method name item 211 for describing a method name of the interface and an argument information item 212 for describing an argument of the method. The method information has a record for each method. A method name "add" and argument information "integer type" are stored in the record 213. A method name "clear" and argument information "no argument" are stored in the record 214.

The RemoteCart type information 104 contains a type name 281, an inherited interface type name 282 and method information. The type name 281 describes the type name of the RemoteCart interface and stores a value "RemoteCart". The inherited interface type name 282 describes the interface inherited by the RemoteCart interface, and has a record 283 for each inherited interface. A convention interface "Remote" corresponding to the remote calling convention is stored in the record 283. The method information includes items, a method name item 291 for describing a method name of the interface and an argument information item 292 for describing an argument of the method. The method information has a record for each method. The method name "add" and argument information "integer type" are stored in the record 293. The method name "clear" and argument information "no argument" are stored in the record 294.

As shown in FIG. 2, the method information contained in the caller type information 221 and the method information contained in the callee type information 222 has the same method name and argument information.

The proxy class 174 is a class which inherited the calling interface for the local calling convention and implemented the method. The proxy class 174 includes type information 240 and method implementation 270. The type information 240 contains a type name 241, an inherited interface type name 242, method information and data information. The type name 241 describes its type name and stores a value "LocalCartProxy". The inherited interface type name 242 describes the type name of the interface inherited by the proxy class, and has a record 243 for each inherited interface. A calling interface "LocalCart" is stored in the record 243. The method information has items, a method name item 250 for describing the method name of the proxy class and an argument information item 251 for describing an argument of the method. The method information has a record for each method. The method name "add" and argument information "integer type" are stored in the record 252, and the method name "clear" and argument information "no argument" are stored in the record 253. The data information has items, a data name item 260 for describing the name of data held by the proxy class and a data type name item 261 for describing the type of data. The data information has one record 262 in which a data name "ref" and data type name "RemoteCart" are stored. The data name may be another data name so long as it can be referred to by the method implementation of the proxy class.

The reference object of the callee component is stored as the data of the proxy object. The method implementation 270 includes a processing procedure for each method for the interface, an "add" procedure 271 and a "clear" procedure 272. The "add" procedure 271 is executed when an "add" method of the instance of the proxy class 174 is called, and the call is transferred by calling the "add" method of the reference object stored in the data name "ref". The "clear" procedure 272 is executed when a "clear" method of the instance of the proxy class 174 is called, and the call is transferred by calling the "clear" method of the reference object stored in the data name "ref". The processing procedure for each method for the interface transforms a difference between calling conventions when the call is transferred. For example, Java exceptions determined in accordance with the types of calling conventions are mutually transformed.

The procedure of generating the proxy class 174 by the proxy class generator 230 will be described. A type name "LocalCartProxy" combining the type name "LocalCart" 201 in the LocalCart information 104 contained in the caller type information 221 with "Proxy" is output to the type name 241 of the proxy class 174. The method of generating the type name of the proxy class is not limited only to combining "Proxy", but any method may be used if it can uniquely identify the type name from the calling interface name of the caller by using a predetermined rule. The type name "LocalCart" 201 in the LocalCart type information 104 contained in the caller type information 221 is output to the record 243 of the inherited interface type name of the proxy class 174. The type name "RemoteCart" in the RemoteCart type information 136 contained in the callee type information 222 is output to the record 262 of the proxy class 174. The contents of the method information in the LocalCart type information 104 contained in the caller type information 221 are copied to the method information in the proxy class 174. The data name "ref" is output to the record 262 of the data name item in the proxy class 174. The data name is not limited only to "ref", but another data name may be used if the method implementation in the proxy class can be referred to. The method name and argument information are referred to for each record of the method information in the proxy class 174 and the procedure for each method is generated and output to the method implementation 270.

Figure 6:
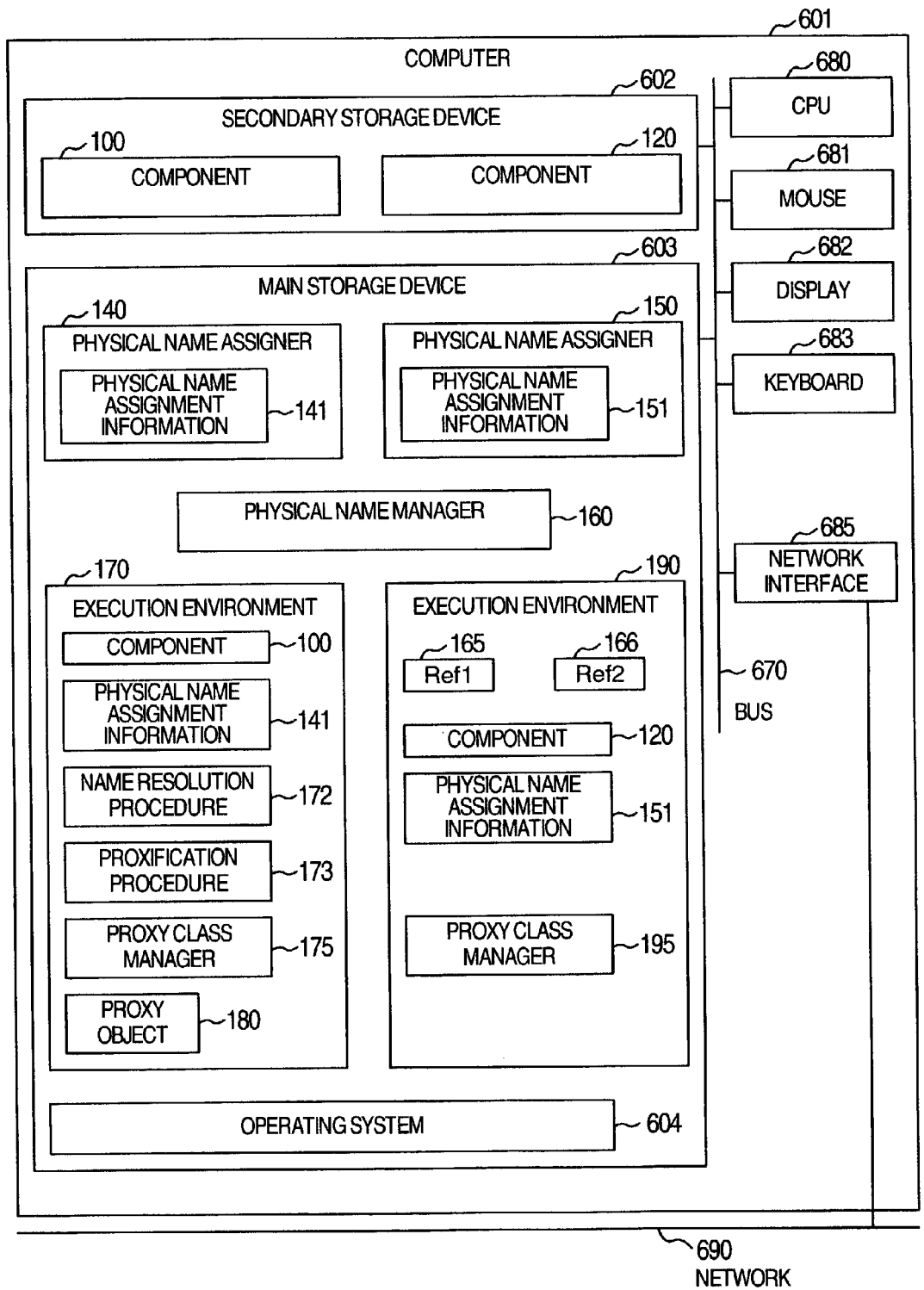
FIG. 6 is a diagram showing a system of generating a calling convention transformation process according to an embodiment.

FIG. 6 is a diagram showing the structure of a system.

A computer 601 is constituted of a secondary storage device 602, a main storage device 603, a CPU 680, a mouse 681, a display 682, a keyboard 683, a network interface 685 and a bus 670 interconnecting these devices. The computer 601 is connected to a network via the network interface 685. The secondary storage device 602 stores the components 100 and 120. The main storage device 603 stores an operating system 604, the physical name assigners 140 and 150, the physical name manager 160, and the execution environments 170 and 190. One of the execution environments 170 and 190 may be stored in a main storage device of another computer connected to the network 690.

The proxy class is generated by the caller execution environment 170 or the callee execution environment 190. Each process will be described by referring to FIGS. 3 and 4.

Figure 3:
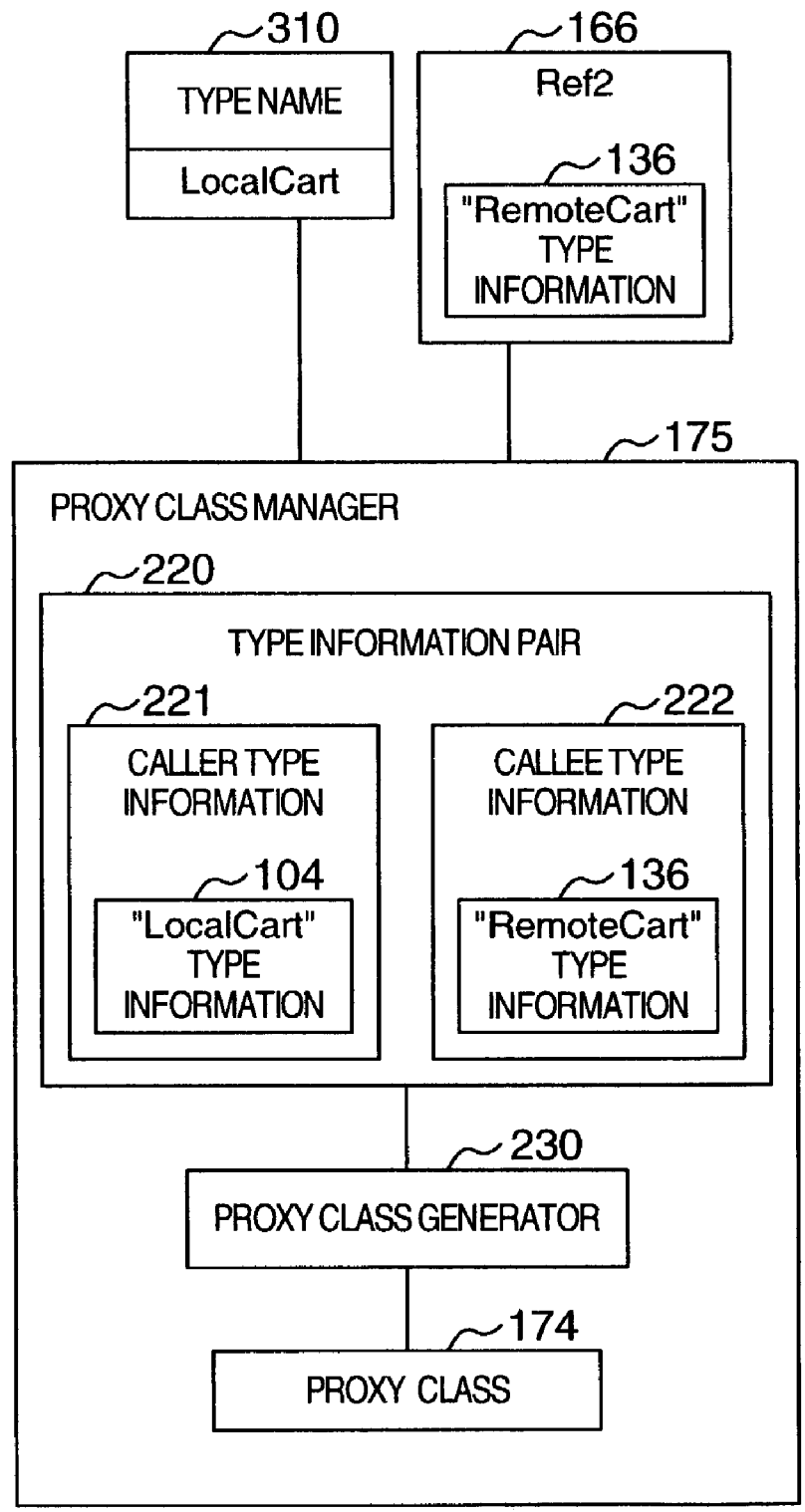
FIG. 3 is a diagram showing a proxy manager according to one embodiment.

FIG. 3 is a diagram of the proxy class manager for generating a proxy class in the caller execution environment 170 according to an embodiment.

In the embodiment shown in FIG. 3, the proxy class manager 175 generates the proxy class 174 by referring to the type information.

The proxy class manager 175 includes the type information pair 220, proxy class generator 230 and proxy class 174.

The object identifier 166 in the example shown in FIG. 3 includes the RemoteCart type information 136 which is type information of the calling interface of the callee.

The proxy class manager 175 receives a type name 310 of the calling interface of the caller and the object identifier 166. The type information acquired from the type name 310 of the calling interface of the caller by referring to the type information group of the caller component is stored in the caller type information 221 in the type information pair 220, the type information 136 in the object identifier 166 is stored in the caller type information 222 in the type information pair 220, and the type information pair 220 is input to the proxy class generator 230. The proxy class generator 230 generates and outputs the proxy class 174.

In the example shown in FIG. 3, the proxy class manager receives the type name "LocalCart" 310 of the calling interface of the caller and the object identifier "Ref2" 166. The LocalCart type information 104 corresponding to the type name "LocalCart" 310 of the calling interface of the caller is acquired by referring to the type information group 103 in the caller component 100, and stored in the caller type information 221 in the type information pair 220. The RemoteCart type information 136 in the object identifier "Ref2" 166 is stored in the caller type information 222 in the type information pair 220. The type information pair 220 is input to the proxy class generator 230. The proxy class generator 230 operates in the manner similar to that described with reference to FIG. 2, and generates and outputs the proxy class 174.

The method of acquiring the type information of the calling interface of the caller may be realized in the following manner. The object identifier 166 is provided with a type information acquisition method for acquiring the RemoteCart type information 136 of the calling interface of the caller, and the proxy class manager 175 calls the type information pair acquisition method in the object identifier 166.

Figure 4:
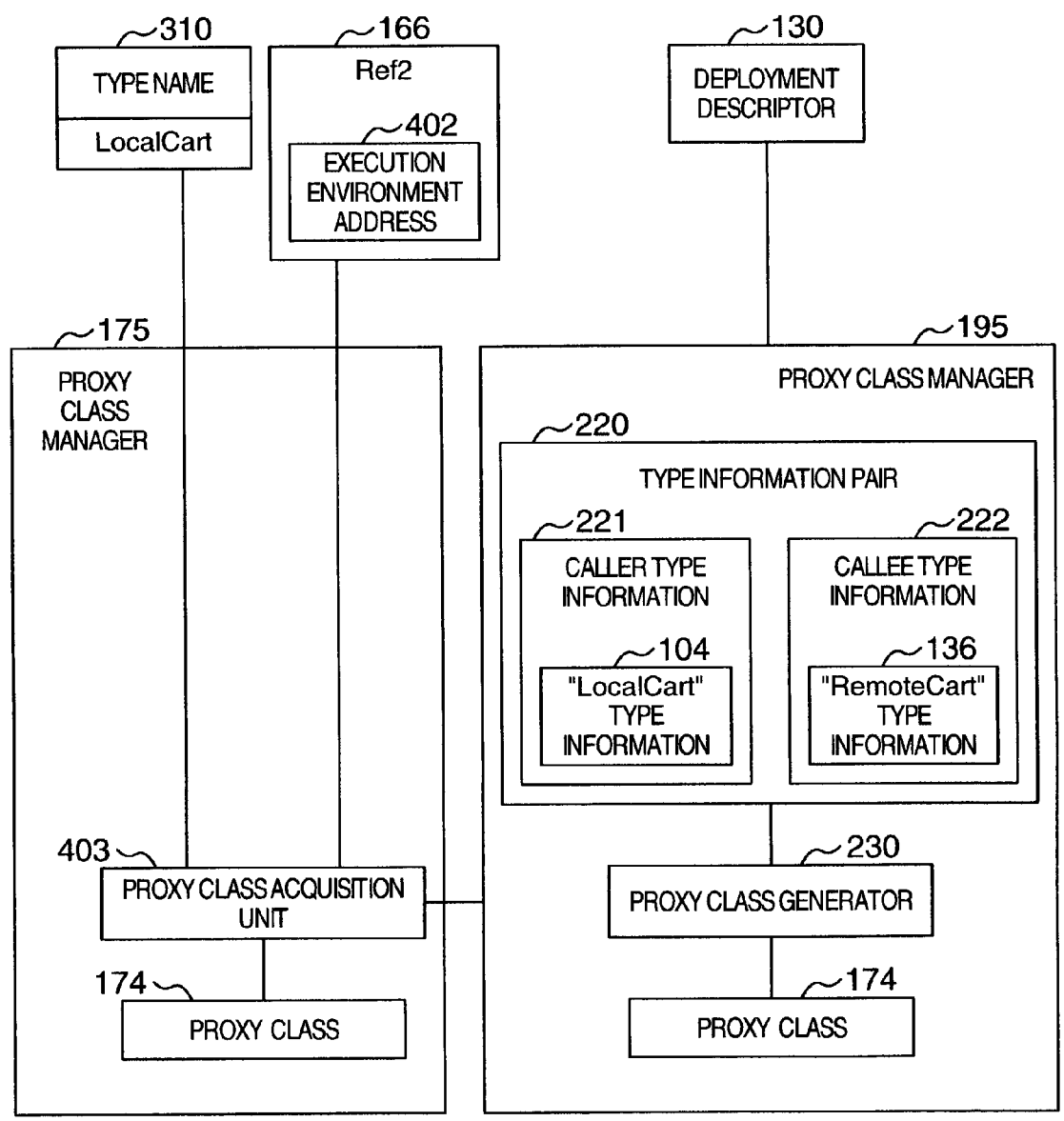
FIG. 4 is a diagram showing a proxy manager according to another embodiment.

FIG. 4 is a diagram of the proxy class manager for generating a proxy class in the callee execution environment 190 according to an embodiment.

In the embodiment shown in FIG. 4, the proxy class manager 195 generates the proxy class 174 by referring to the information in the execution environment 190, and the proxy class manager 175 acquires the generated proxy class 174 and uses it in the execution environment 170.

The proxy class manager 195 includes the type information pair 220, proxy class generator 230 and proxy class 174. The proxy class manager 195 generates the proxy class 174 and stores it. In response to a request from the proxy class manager 175, the proxy class manager 175 passes the stored proxy class 174 to the proxy class manager 175.

In the operation that the proxy class manager 195 generates the proxy class 174 and stores it, the proxy class manager 195 receives the deployment descriptor 130, generates the type information pair 220 for each record of the deployment descriptor 130, makes the proxy class generator 230 generate the proxy class 174, and stores it. In generating the type information pair 220, the type information acquired by referring to the type information group 135 by using the value in the local call type name item 131 of the record is stored in the caller type information 221, and the type information acquired by referring to the type information group 135 by using the value in the remote call type name item 132 of the record is stored in the callee type information 222.

In the example shown in FIG. 4, the proxy class manager 195 receives the deployment descriptor 130, generates the type information pair 220 for the record 133, makes the proxy class generator generate the proxy class 174, and stores it. In generating the type information pair 220, the LocalCart type information 104 acquired by referring to the type information group 135 by using the value "LocalCart" in the local call type name item 131 of the record 133 is stored in the caller type information 221, and the Remote-Cart type information 136 acquired by referring to the type information group 135 by using the value "RemoteCart" in the remote call type name item 132 of the record 133 is stored in the callee type information 222. The stored information is input to the proxy class generator 230. The proxy class generator 230 operates in the manner similar to that described with reference to FIG. 2, and generates and outputs the proxy class 174.

In the operation that in response to a request from the proxy class manager 175, the proxy class manager 195 passes the stored proxy class 174 to the proxy class manager 175, the proxy class manager 195 receives the type name requested by the proxy class manager 175 and outputs the proxy class 174 storing the type name to the proxy class manager 175.

The proxy class manager 175 includes a proxy class acquisition unit 403 and the proxy class 174. The proxy class manager 175 receives the type name 310 of the calling interface of the caller and the object identifier 166. In the example shown in FIG. 4, the object identifier 166 includes an execution environment address 402 for identifying the position of the execution environment 190 of the callee component. The proxy class acquisition unit 403 generates the type name of the proxy class from the type name 310 of the calling interface of the caller, and requests the proxy class 174 having the generated type name from the proxy class manager 195 having the execution environment 190 identified by the execution environment address 402 in the object identifier 166. The proxy class manager 175 outputs the acquired proxy class 174.

In the example shown in FIG. 4, the proxy class manager 175 receives the type name "LocalCart" 310 of the calling interface of the caller and the object identifier "Ref2" 166. The execution environment address 402 in the object identifier "Ref2" 166 identifies the location of the execution environment 190. The proxy class acquisition unit 403 generates the type name "LocalCartProxy" of the proxy class from the type name "LocalCart" 310 and requests the proxy class 174 having the generated type name "LocalCartProxy" from the proxy class manager 195 having the execution environment 190 identified by the execution environment address 402 in the object identifier 166. The proxy class manager 175 outputs the acquired proxy class 174.

Figure 5:
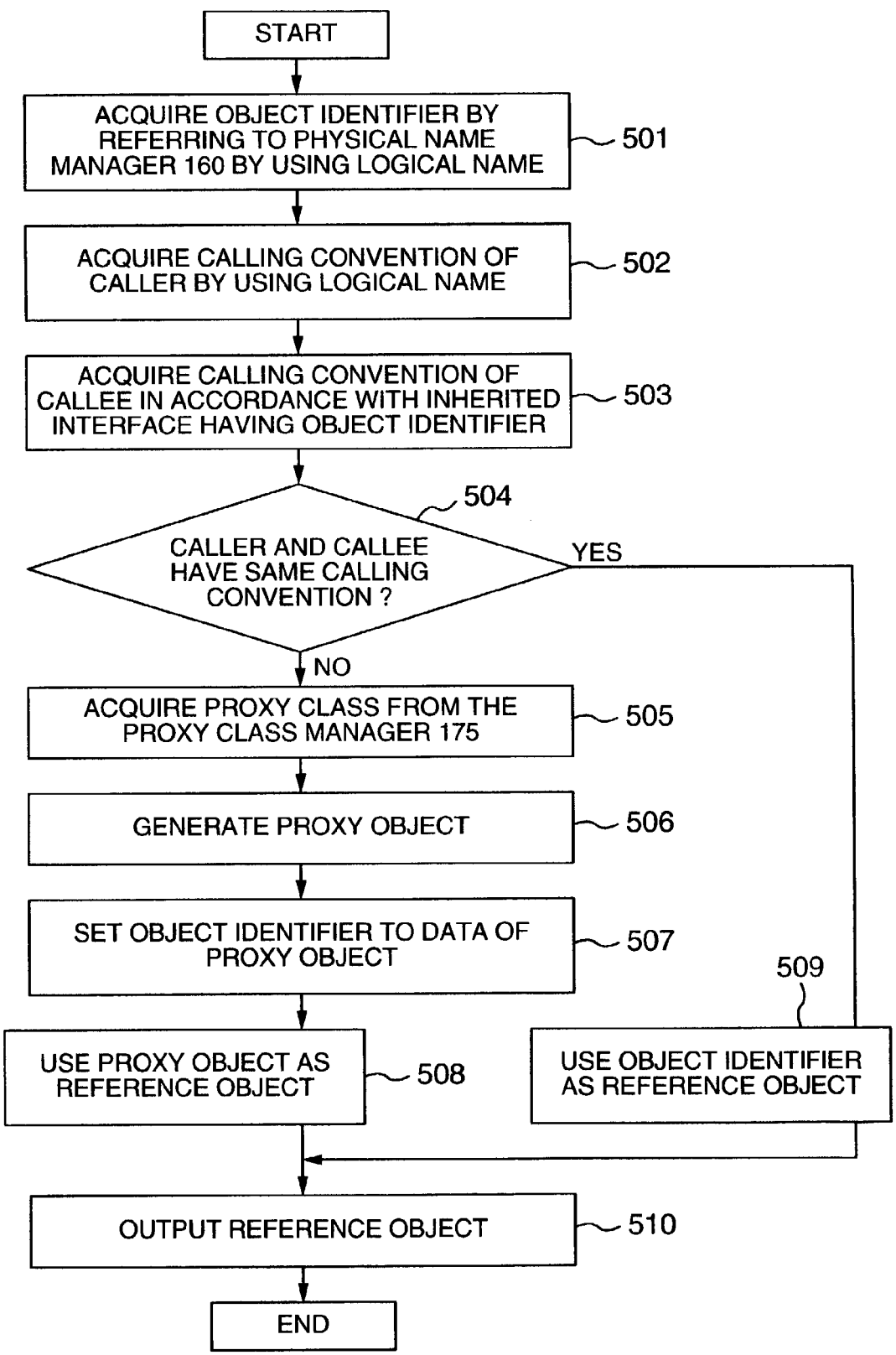
FIG. 5 is a flow chart illustrating the operations of a name resolution procedure and a proxification procedure.

FIG. 5 is a flow chart illustrating the operation of the name resolution procedure 172 and the proxification procedure 173.

(Step 501) The name resolution procedure 172 refers to the physical name manager 160 by using the received logical name to acquire the corresponding object identifier.

(Step 502) The name resolution procedure 172 supplies the logical name and the object identifier to the proxification procedure 173. The proxification procedure 173 refers to the deployment descriptor 110 by using the supplied logical name to acquire the value of the calling convention item 112 and use it as the calling convention of the caller.

(Step 503) It is checked whether the inherited interface having the type information of the input object identifier is coincident with either the local or remote convention interface. The coincident interface is used as the calling convention of the callee.

(Step 504) It is checked whether the calling convention of the caller is coincident with the calling convention of the callee.

(Step 509) If coincident, the object identifier is used as the reference object. If not coincident, Steps 505 to 508 are executed.

(Step 505) The proxification procedure 173 passes the type name in the type name item 113 and the object identifier acquired by referring to to the deployment descriptor 110 by using the logical name, to the proxy class manager 175 to acquire the proxy class.

(Step 506) A proxy object as the instance of the proxy class is generated.

(Step 507) The object identifier is set to the data of the proxy object.

(Step 508) The proxy object is used as the reference object.

(Step 510) The proxification procedure 173 outputs the reference object to the name resolution procedure 172 which in turn outputs the reference object.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method for generating a calling convention transformation process to be executed in response to a call from a first component deployed in a first execution environment to a second component deployed in a second execution environment in a computer system for deploying components in execution environments, the component containing an application program and information necessary for execution of the application program, wherein:

a call or a call reception of a component conforms with a local or remote calling convention and a calling interface, in the local calling convention a call procedure is an object call using a programming language and the calling interface inherits a predetermined local convention interface, and in the remote calling convention, a call procedure is a distributed object call and the calling interface inherits a predetermined remote calling convention interface;

said first component stores a first deployment descriptor and first type information including method information of a first calling interface, the first deployment descriptor including a logical name for referring to said second component, a type of a first calling convention with which a call to said second component conforms, and a name of the first calling interface with which the call to said second component conforms;

said second component stores a second deployment descriptor, second type information including method information of a second calling interface, and third type information including method information of a third calling interface, the second deployment descriptor including a name of the second calling interface for receiving a call in accordance with the local calling convention and a name of the third calling interface for receiving a call in accordance with the remote calling convention;

if the first calling convention is the local calling convention, the first calling interface and the second calling interface are the same and the first type information and the second type information are the same, whereas if the first calling convention is the remote calling convention, the first calling interface and the third calling interface are the same and the first type information and the third type information are the same;

when said second component is deployed in the second execution environment, the second component is assigned a physical name unique in the network for each calling interface of said second component, and the second execution environment generates an object identifier for referring to said second component for each calling interface of said second component and registers the object identifier in a physical name manager in correspondence with the physical name; and when said first component is deployed in the first execution environment, said first component is given the physical name corresponding to the logical name so as to permit reference to said second component, wherein the method for generating a calling convention transformation process comprises steps of:

acquiring the type of the first calling convention by referring to the first deployment descriptor by using an input logical name;

acquiring the registered object identifier by referring to the physical name manager by using the physical name corresponding to the logical name and acquiring a type of a second calling convention with which a calling interface conforms, a call reception at said second component corresponding to the acquired object identifier conforming with the calling interface, by referring to an inherited interface name in type information of the calling interface; and comparing the type of the first calling convention with the type of the second calling convention, respectively acquired at said steps recited above, and if the types are different, generating a proxy object for transformation of the calling convention.

2. A method for generating a calling convention transformation process according to claim 1, further comprising a step of:

acquiring the registered object identifier by referring to the physical name manager by using the physical name corresponding to the logical name, and making the first execution environment generate a class of the proxy object by referring to the first type information of the first calling interface and type information of the calling interface with which the call reception at said second component corresponding to the object identifier conforms.

3. A method for generating a calling convention transformation process according to claim 1, further comprising steps of:

making the second execution environment generate a class of the proxy object by referring to the second and third type information contained in the second deployment descriptor; and making the first execution environment transfer the class from the second execution environment to the first execution environment.

4. A method for generating a calling convention transformation process according to claim 1, wherein a J2EE execution environment is applied to the execution environment.

5. An apparatus having a processor for generating a calling convention transformation process to be executed in response to a call from a first component deployed in a first execution environment to a second component deployed in a second execution environment in a computer system for deploying components in execution environments, the component containing an application program and information necessary for execution of the application program, wherein:

a call or a call reception of a component conforms with a local or remote calling convention and a calling interface, in the local calling convention a call procedure is an object call using a programming language and the calling interface inherits a predetermined local convention interface, and in the remote calling convention, a call procedure is a distributed object call and the calling interface inherits a predetermined remote calling convention interface;

said first component stores a first deployment descriptor and first type information including method information of a first calling interface, the first deployment descriptor including a logical name for referring to said second component, a type of a first calling convention with which a call to said second component conforms, and a name of the first calling interface with which the call to said second component conforms;

said second component stores a second deployment descriptor, second type information including method information of a second calling interface, and third type information including method information of a third calling interface, the second deployment descriptor including a name of the second calling interface for receiving a call in accordance with the local calling convention and a name of the third calling convention for receiving a call in accordance with the remote calling convention;

if the first calling convention is the local calling convention, the first calling interface and the second calling interface are the same and the first type information and the second type information are the same, whereas if the first calling convention is the remote calling convention, the first calling interface and the third calling interface are the same and the first type information and the third type information are the same;

when said second component is deployed in the second execution environment, the second component is assigned a physical name unique in the network for each calling interface of said second component, and the second execution environment generates an object identifier for referring to said second component for each calling interface of said second component and registers the object identifier in a physical name manager in correspondence with the physical name; and when said first component is deployed in the first execution environment, said first component is given the physical name corresponding to the logical name so as to permit reference to said second component, wherein the apparatus for generating a calling convention transformation process comprises:

a unit which acquires the type of the first calling convention by referring to the first deployment descriptor by using an input logical name;

a unit which acquires the registered object identifier by referring to the physical name manager by using the physical name corresponding to the logical name and acquires a type of a second calling convention with which a calling interface conforms, a call reception at said second component corresponding to the acquired object identifier conforming with the calling interface, by referring to an inherited interface name in type information of the calling interface; and a unit which compares the type of the first calling convention with the type of the second calling convention, respectively acquired at said steps recited above, and if the types are different, generates a proxy object for transformation of the calling convention.

* * * * *